United States Patent [19]

Newman

[11] Patent Number: 4,726,763
[45] Date of Patent: Feb. 23, 1988

[54] DUAL INSULATED CERAMIC BURNER
[75] Inventor: Ray L. Newman, Towanda, Pa.
[73] Assignee: GTE Products Corporation, Stamford, Conn.
[21] Appl. No.: 422,619
[22] Filed: Sep. 24, 1982
[51] Int. Cl.$^4$ .............................................. B05B 7/06
[52] U.S. Cl. ..................................... 431/188; 431/284; 431/353
[58] Field of Search ............... 431/154, 155, 156, 157, 431/158, 353, 187, 188, 184, 284; 432/222

[56] References Cited
U.S. PATENT DOCUMENTS

| | | | |
|---|---|---|---|
| 1,344,438 | 6/1920 | Buell et al. | 431/157 |
| 2,480,255 | 8/1949 | Mortson et al. | 431/187 |
| 3,147,795 | 9/1964 | Livingston et al. | 431/284 |
| 3,262,484 | 7/1966 | Hess | 431/157 |
| 3,384,442 | 5/1968 | Stewart | 431/264 |
| 3,568,932 | 3/1971 | Van Laar | 431/187 |
| 3,589,852 | 6/1971 | Buchanon | 431/158 |
| 3,689,039 | 9/1972 | Kilgren | 432/222 |
| 3,837,793 | 9/1974 | Luciees et al. | 432/217 |

FOREIGN PATENT DOCUMENTS 0121243  7/1926  Switzerland ........................ 431/188

Primary Examiner—Samuel Scott
Assistant Examiner—H. A. Odar
Attorney, Agent, or Firm—James Theodosopoulos

[57] ABSTRACT

A gas burner comprises a ceramic tube or nozzle through which a gaseous fuel flows, a chamber surrounding the ceramic tube, and means for delivering preheated combustion air to the chamber. The tube is made of an insulating ceramic in order to insulate the fuel from the preheated air. The inner portion of the tube comprises an insulating ceramic having lower thermal conductivity than that of the outer portion.

7 Claims, 1 Drawing Figure

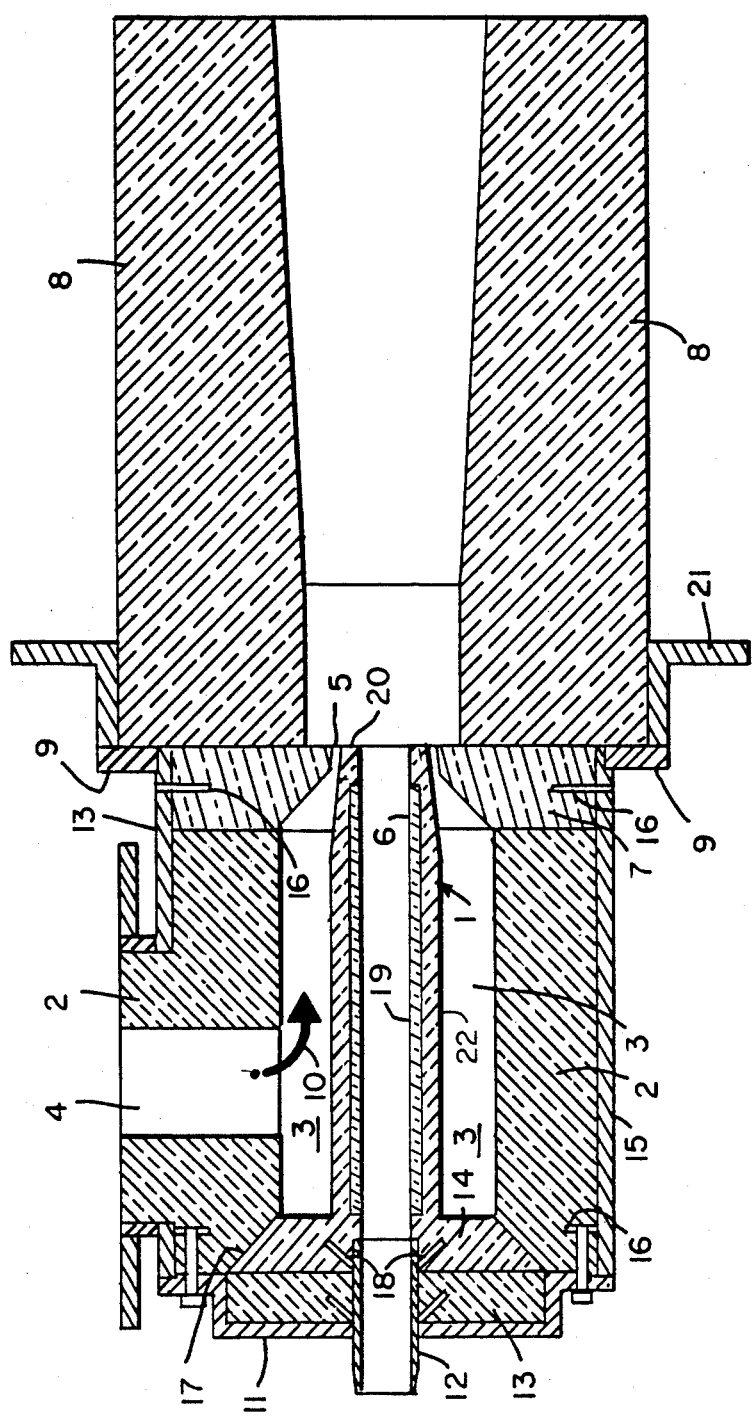

DUAL INSULATED CERAMIC BURNER

This invention concerns gas burners. It particularly relates to such burners that are used in conjunction with heat recuperators, for example, ceramic cross-flow recuperators such as are shown in U.S. Pat. Nos. 4,083,400, 4,130,160, 4,279,297 and 4,300,627. The use of such recuperators is becoming more widespread because they conserve energy. Such recuperators preheat combustion air before the air is delivered to a burner where the air is mixed with gaseous fuel prior to combustion of the fuel. As the efficiency of such recuperators is continually improving, the temperatures to which the combustion air is heated has been increasing. This results in a problem in conventional burners where the combustion air is introduced around the gas inlet tube or nozzle at a point or region in back of the nozzle tip. The hot combustion air can heat the gas, before combustion, to a temperature high enough to crack the gas, that is to say, to break the gas down into constituents that will not burn completely. For example, some of the methane component of natural gas could be broken down into carbon and hydrogen, with the result that the carbon does not burn completely. In such a case, not only is there inefficient combustion, but the burner can soot up rapidly, necessitating frequent cleanings. The cracking temperature of one gaseous fuel, namely, natural gas, is about 900° F.

My invention solves the problem by making the gas inlet tube or nozzle of an insulating ceramic that prevents the gas passing therethrough from being heated to its cracking temperature by the surrounding preheated combustion air even when the temperature of the surrounding preheated combustion air exceeds, substantially, the cracking temperature of the gas.

The single FIGURE in the drawing is a sectional view of a ceramic burner in accordance with this invention.

As shown in the drawing, a ceramic burner in accordance with this invention comprises a gas inlet tube or nozzle 1 which is made of an insulating ceramic. Nozzle 1 is disposed within a ceramic body 2 providing a surrounding chamber 3 around nozzle 1. A hole 4 through ceramic body 2 is the inlet for preheated combustion air which enters chamber 3 and follows the path of arrow 10. The air flows forward through a venturi 5 formed between the forward end 6 of nozzle 1, which is tapered, and the forward section 7 of ceramic body 2, which is also tapered. Mixing of the gas and air occurs just forward of venturi 5 within ceramic tile 8 where combustion takes place. Ceramic combustion chambers similar to ceramic tile 8 are shown in U.S. Pat. Nos. 4,144,020, 4,060,380 and 3,676,048 where they are also called burner blocks.

In one embodiment, ceramic tile 8 was 13½ inches long by 10 inches square and the hole therethrough was 3 inches diameter at the nozzle end, tapering to 4 inches diameter at the other end. Ceramic tile 8 was made by casting Alundum Castable Cement CA 334 (Norton Co., Worcester, Mass.) in a suitable mold; the mold was removed after setting, of course. Four anchor bolts (not shown) were embedded in the casting for securing it to metal base 9.

Nozzle 1 was made by casting Kaolite 2200, a silica-alumina-calcia insulating casting cement made by Babcock & Wilcox Co., Augusta, Ga., within metal end cap 11, the casting being designated in the drawing as casting 13. End cap 11 had a short threaded metal pipe 12 fastened thereto and protruding therethrough. Several short metal rods 18 were welded to pipe 12 and protruded angularly into casting 13 to secure the casting. The remainder of nozzle 1 was then made by casting Alundum Insulating Castable Cement CA 333 on top of casting 13, this second casting being designated as casting 14, the desired shape of the nozzle being obtained by the use of a suitable mold with a removable cylindrical rod to form the hole through the nozzle. Metal pipe 12, with additional metal rods 18, protruded into casting 14. In this example, casting 13 had a diameter of 6½ inches and a thickness of 1 inch. The overall length of nozzle 1 was 10¾ inches and the wall thickness thereof was ⅝ inch at a point 1 inch from casting 13, tapering to a wall thickness of ⅜ inch at a point 7½ inches from casting 13. At tip 20 of nozzle 1, the wall thickness was ⅜ inch.

Ceramic body 2 was also made of a castable cement, forward section 7 thereof being cast of CA 333 and the remainder being cast of Kaolite 2200. Ceramic body 2 was cast within metal shell 15 from which metal pins 16, welded thereto, protruded into the casting to secure it to metal shell 15. The outer diameter of ceramic body 2 was 8 inches and its inner diameter, excluding forward end 8, was 4½ inches. The overall length of ceramic body 2 was 9¾ inches. The inner diameter of forward end 8 was angled about 45°, as shown in the drawing, and then tapered to provide venturi 5 between it and tapered forward end 6 of nozzle 1. At the rear, the inner diameter of ceramic body 2 was also angled about 45° in order to mate with similarly angled surface 17 of casting 14 of nozzle 1. The diameter of hole 4 was 2 inches.

Kaolite 2200 and CA 333 are both insulating ceramics. Kaolite 2200 is a more efficient insulator, but can only be used at temperatures up to about 2200° F., while CA 333 can be used at temperatures up to about 3300° F. For this reason, Kaolite 2200 is used to make casting 13, which is exposed to a low operating temperature, while CA 333 is used to make casting 14, which is exposed to a higher operating temperature.

In operation, the burner could be mounted on a furnace wall, with ceramic tile 8 protruding therethrough, by means of mounting plate 21.

The insulating effect of nozzle 1 can be improved by dual insulation, that is to say, by using a higher insulating value ceramic material on the cooler portion of nozzle 1, namely, on inner wall 19 through which the combustion gas flows. An example of such a material is Fiberfrax, a high insulating value alumina-silica ceramic fiber paper made by Carborundum Co., Niagara Falls, N.Y. The ceramic material can be disposed at inner wall 19 of nozzle 1 by, for example, wrapping the removable rod, coated with a release agent, with the Fiberfrax. After nozzle 1 is cast, the Fiberfrax is held in place by the CA 333.

A comparison was made of the above nozzle when casting 14 was made entirely of CA 333 and when inner wall 19 of casting 14 was made of Fiberfrax. Two layers of ⅛" thick Fiberfrax were wrapped around the removable rod; therefore, the thickness of the Fiberfrax layer of inner wall 19 was ¼". The remaining thickness, on outer wall 22, comprised CA 333.

For a preheated air temperature of 1200° F., the temperature of the inner wall face was 813° F. for the CA 333 construction, while for the CA 333 plus Fiberfrax construction, said inner wall face temperature was only 473° F. For a preheated air temperature of 1400° F., the inner wall face temperatures were, respectively, 901° F.

and 535° F. At these temperatures, the thermal conductivity of the CA 333 is about 6.5 BTU/hr/sq.ft./in./°F., while that of the Fiberfrax is about 0.8, considerably lower.

I claim:

1. A gas burner comprising: an inlet tube for delivery of a gaseous fuel therethrough, said tube being made of an insulating ceramic, said tube having a tip at the exit end thereof, said tube having an inner wall and an outer wall, said inner wall comprising a first ceramic material and said outer wall comprising a second ceramic material, said first ceramic material having substantially lower thermal conductivity than said second ceramic material; a chamber surrounding said tube; and means for delivering preheated combustion air into said chamber rearward of said tip.

2. The burner of claim 1 wherein said ceramic inlet tube is disposed within and spaced from a ceramic body, said chamber comprising the space between said ceramic inlet tube and said ceramic body.

3. The burner of claim 2 wherein said means for delivering combustion air includes a hole through said ceramic body.

4. The burner of claim 1 comprising, in addition, a ceramic tile forward of said ceramic inlet tube, combustion of gaseous fuel taking place within said ceramic tile.

5. The burner of claim 1 wherein said tube is sufficiently insulated by said insulating ceramic to prevent said gaseous fuel from being heated to its cracking temperature when the temperature of said preheated combustion air in said chamber substantially exceeds said cracking temperature.

6. The burner of claim 1 wherein said first ceramic material comprises an alumina-silica ceramic fiber paper.

7. The burner of claim 1 wherein said inlet tube is made of a castable ceramic.

* * * * *